May 26, 1953 E. A. STALKER 2,639,874
HELICOPTER WINGS AND OTHER AIRCRAFT STRUCTURES
WITH BOUNDARY LAYER CONTROL
Filed Sept. 10, 1948 2 Sheets-Sheet 1
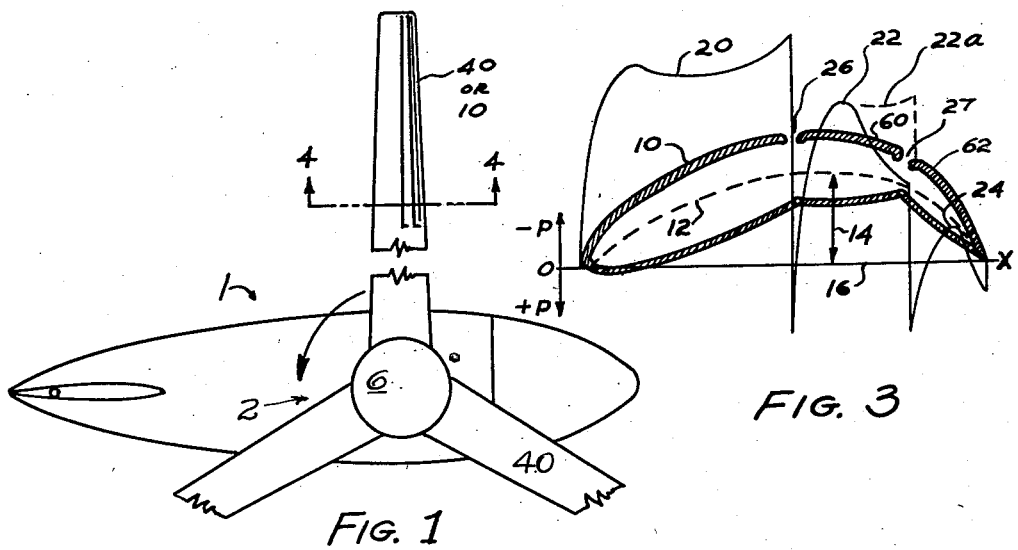
FIG. 1
FIG. 3
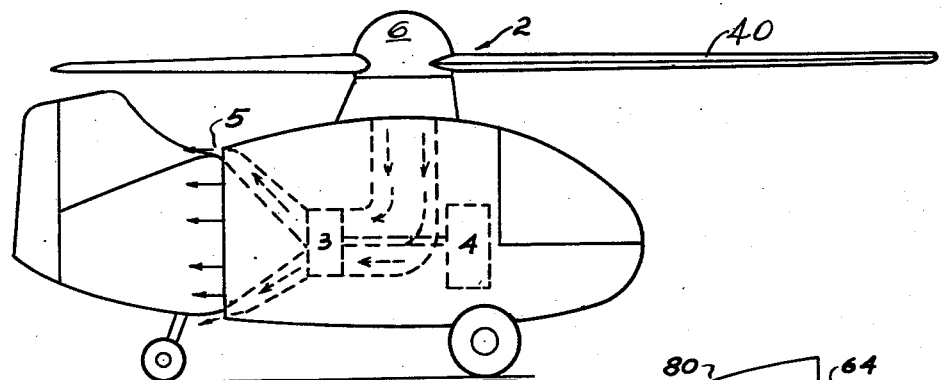
FIG. 2
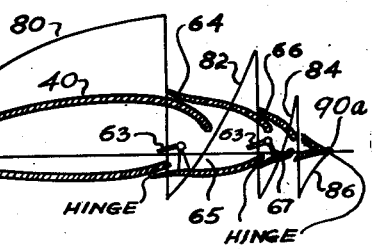
FIG. 5
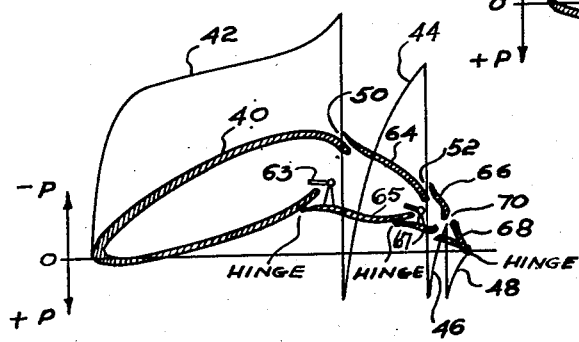
FIG. 4
INVENTOR.
Edward A. Stalker May 26, 1953          E. A. STALKER          2,639,874
HELICOPTER WINGS AND OTHER AIRCRAFT STRUCTURES
WITH BOUNDARY LAYER CONTROL
Filed Sept. 10, 1948          2 Sheets-Sheet 2

INVENTOR.
Edward A. Stalker

Patented May 26, 1953

2,639,874

UNITED STATES PATENT OFFICE 2,639,874

HELICOPTER WINGS AND OTHER AIRCRAFT STRUCTURES WITH BOUNDARY LAYER CONTROL

Edward A. Stalker, Bay City, Mich.

Application September 10, 1948, Serial No. 48,616

10 Claims. (Cl. 244—42)

This invention relates to helicopter wings, aircraft wings and bodies such as fuselages.

An object of the invention is to reduce the drag of aircraft structures.

Another object is to increase the maximum lift coefficient of a wing with a small expenditure of power for controlling the boundary layer.

Other objects will appear from the description, claims and drawings.

The above objects are accomplished by the means illustrated in the accompanying drawings in which—

Fig. 1 is a fragmentary top plan view of a helicopter incorporating the invention;

Fig. 2 is a side elevation of the helicopter in Fig. 1;

Fig. 3 shows a highly cambered wing section with one type of pressure distribution;

Fig. 4 shows a highly cambered wing section (taken along line 4—4 in either Fig. 1 or 11) having a special contour to provide an efficient type of pressure distribution;

Fig. 5 shows the wing section of Fig. 4 with the flaps up;

Figure 6:
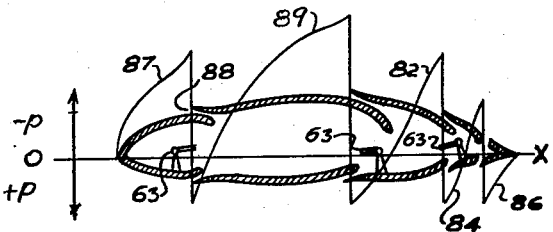
Fig. 6 shows the wing section of Fig. 5 with an additional slot at the nose.

Contemporary helicopters have a relatively low lifting capacity per horsepower resulting in very low pay loads as compared to fixed wing aircraft. The lifting capacity of a helicopter in vertical flight is not a function of the maximum lift coefficient of the wings but depends primarily on a low magnitude for the profile drag. This invention discloses wings which have very low drag coefficients.

Maximum lift coefficients are significant for helicopter wings to sustain the retreating wing and prevent vibration. This invention discloses slotted wing sections which provide very high lifting capacity for a very small amount of power to induce flows through the slots to control the boundary layers.

Although these wings are especially useful for direct lift aircraft, they are also very useful for fixed wing aircraft.

Referring to the drawings in Fig. 1 the helicopter is indicated generally as 1. The lifting rotor 2 is arranged for the withdrawal of air by means of the pump 3 driven by the motor 4. The air is discharged from the fuselage through the annular slot 5.

The hub 6 supports the three blades 10 each having suction slots in their surfaces.

It is customary to associate maximum lift coefficients with a pressure distribution over the upper surface having a peak near the leading edge or at least above the forward portion of the wing succeeded by an adverse gradient over the aft portion of the wing.

This invention discloses a means of obtaining favorable gradients over the whole wing from leading to trailing edge when the wing is operating at maximum lift.

When a wing 10 (Fig. 3) is given a high arching of the mean camber line 12 so that the maximum mean camber ordinate 14 above the subtending chord 16 is large, the pressure distribution has substantially the pattern 20, 22, 24 shown. It will be observed that the pressure curve 22 between slots 26 and 27 has a very steep slope close to slot 26 with a reversal of slope extending over the major portion of the distance between slots. The wing described in my U. S. Patent No. 2,406,918 issued September 3, 1946, entitled Wing gives substantially this pattern of pressure. The present invention presents a means of improving this distribution with flap down. It also presents a new form of distribution with flap up.

Fig. 4 shows another wing section 40 having a continuously favorable gradient for the pressure curves 42, 44, 46, and 48 over the upper surface. The pressure curve has a favorable gradient if the values of the fluid pressure decline along the direction of flow. Then the boundary layer will precede rearward for long distance in a laminar state. If there is a reversal in slope or gradient of the pressure curve as shown at 22 in Fig. 3, the boundary layer will become turbulent and the drag will be magnified several times at least. It is also desirable to have the gradient fairly uniform in value as shown by curve 44 between slots 50 and 52.

In Fig. 3 the curve 22 might be raised to the dotted curve 22a by increasing the suction acting through slot 27 but the curve would still be unsatisfactory because it is still not everywhere steep enough to keep the power consumption for the inductions low. In fact the raising of curve 22 to 22a by power means obviously means more power consumption. However if the pressure curve 22 were raised by the proper arching of the wing contour between slots, the slot flow power required would be low.

In Fig. 3 the segments 60 and 62 are convex arcs whose tangents at adjacent ends substantially coincide. That is the segments fair into each other to present a smooth convex contour to the upper surface of the wing.

In contrast in Fig. 4, the segment 64 has a concavity for a short distance aft of the slot succeeded by a relatively long convex length. This shape gives the curve 44 of substantially uniform favorable slope.

The aft portion of a surface is defined as convex if the centers for the radii of curvature always be on the side of the surface toward the body interior. The forward portion of the surface is defined as concave only if said centers change sides with respect to said convex surface.

The segments 64 and 66 are respectively the upper portions of the flaps 65 and 67. The segments are hinged to each other and to the main wing section respectively, and suitable operating and adjusting means 63 are provided as shown.

The segment 66 is similar to segment 64, but the segment 68 aft of slot 70 is made concave throughout its length so that curve 48 just reaches from the stagnation pressure to about zero pressure at the trailing edge.

Fig. 5 shows the contour of the wing section when the flaps are raised. This is the low drag position and again the special contours are highly advantageous because they give more uniform gradients throughout the length of the segment between slots. The pressure distribution curves are 80, 82, 84 and 86.

The type of pressure distribution curve desired for the wing with flaps up is different than with flaps down. A steeper gradient is desirable in the former case in order to assure maintenance of laminar flow in the boundary layer. In the latter case, that is with flaps down, a laminar flow is not desired. It is sufficient that the gradient be favorable or at least not greatly unfavorable so that the flow will proceed rearward without separating from the surface. A turbulent boundary layer is even helpful in preventing separation. By turbulent boundary layer is meant one in which mixing of the air particles is proceeding but there is no eddying such as accompanies separation.

With flaps down maximum lift is the main consideration and hence a large area under the pressure curve is sought above the axis. This is achieved by having the pressure curve rather steep just aft of the slot. It is therefore necessary to compromise to some extent between the flap up and flap down conditions. Lowering the flap however tends to convert the type of pressure curve for flap up to the type desired for flap down.

The flap or flaps are to be depressed until the maximum ordinate of means camber line above its subtending chord is greater than 12% of the chord length. Even at a value less than 12% the flow will separate from the upper surface in the absence of boundary layer control as is well known in the science of aerodynamics. It therefore may be considered as defining a lower boundary value above which boundary layer control is required to achieve increased lift from the greater arching of the mean camber line.

The pressure distribution curve over the fore part of the section can be made more steep throughout its length by placing a slot 88 just aft of the nose, at about 20% of the chord. The section of Fig. 5 is shown in Fig. 6 with such a nose slot. It now has the pressure curves 87 and 89 and it will be observed that the curve 87 is steep throughout its length as compared to curve 80 of Fig. 5.

The contours between slots may be such that the steepest portion of the pressure distribution curve is at its aft end. This assures maintenance of the laminar flow (flap up) for larger Reynolds numbers and in spite of dirt or imperfections in the wing surface.

Figure 7:
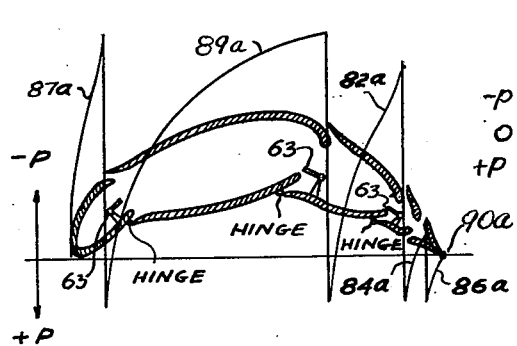
Fig. 7 is the wing of Fig. 6 with the nose and tail flaps depressed.

Fig. 7 shows the wing of Fig. 6 with nose and tail flaps depressed. The pressure curves on the upper surface are 87a, 89a, 82a, 84a and 86a.

Figure 8:
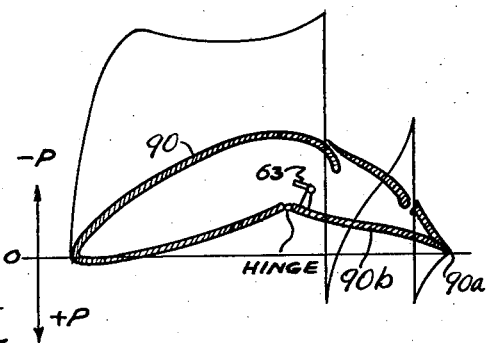
Fig. 8 shows another wing having only one flap.

Fig. 8 shows the application of the special contour to a wing 90 with a single flap 90b whose upper and lower surfaces are hinged at 90a.

In both Figs. 7 and 8 the lower surface of the rear flap is hinged to the lower surface at 90 after the manner described in my U. S. Patent No. 2,423,803, issued July 8, 1947, entitled High Lift Device.

In this type of flap the front edge of the upper surface of the flap is constrained to slide on the surface it overlaps as the flap is lowered. Since the flap surface carries the concave-convex segment the proper favorable gradient is assured over the flap surface.

Laminar flow is not maintained on a concave surface even by a favorable gradient for as great a distance as on a convex surface. It is therefore desirable to keep the concave length short and convert to a convex length in a short distance. Where a short concavity is succeeded by a convexity the flow can be kept laminar. This requires at least two slots and preferably three with the last one relatively close to the trailing edge.

Figure 9:
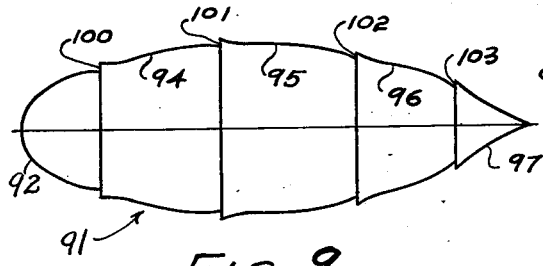
Fig. 9 shows a fuselage with special local contours to reduce the drag.

Fig. 9 shows the application of the concave-convex segments to a fuselage 91. This might also be a nacelle or any other body of the aircraft.

The fuselage is formed of the nose piece 92, and segments 94, 95, 96 and 97. Between the segments are the induction slots 100 and 103. These slots extend transversely to the longitudinal axis and to the relative wind direction, preferably completely along the whole perimeter of the cross section.

The fuselage concave-convex segments insure pressure distributions 120—124 which are especially favorable to the maintenance of low drag of laminar flow.

Figure 11:
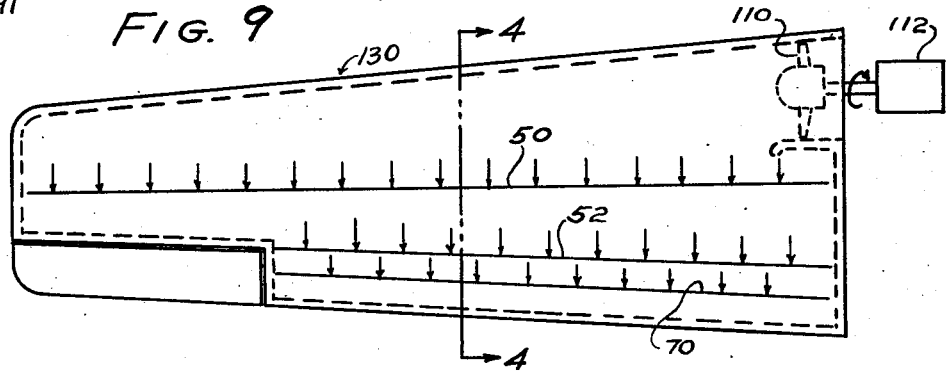
Fig. 11 is a top plan view of a wing for a fixed wing aircraft.
Figure 10:
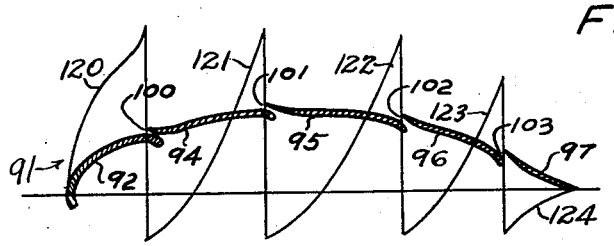
Fig. 10 is an axial section of the fuselage of Fig. 9.

Fig. 11 shows the pumping means or blower 110 which is driven by the motor 112 to cause the boundary layer to be inducted through the slots of an airplane wing 120.

It will now be clear that I have provided wings which have very high lifting capacity with a very small expenditure of power. This is achieved by forming the surface segments between slots with a special contour which gives a steeper, better distributed gradient between slots. Since these gradients are brought into existence by the geometry of the wing acting in conjunction with the relative wind, only a very small power is required from the pumping means for inducting air through the slots. It is to be noted that the flaps have the concave-convex contour built into the flaps themselves.

When in the high speed condition the wings have a low drag because the favorable properly distributed gradients of the pressure distribution curve keep the boundary layer flow in the laminar condition.

While I have illustrated a specific form of this invention it is to be understood that I do not intend to limit myself to this exact form but intend to claim my invention broadly as indicated by the appended claims.

I claim:

1. In combination, a fore body and a flap supported in adjustable relation with said flap substantially in line chordwise with said fore body to form a wing adapted to be bathed by a flow of fluid, said flap having a chordwise extending upper surface contour which is concave along its forward portion and convex along its aft portion, said concave portion being shorter than said convex portion and being spaced outward from the aft surface of said fore body to form an induction slot and to present a leading edge to said flow, said concave-convex surface cooperating with said slot to provide a continuously favorable pressure gradient thereacross, and means to induce an inward flow of air through said slot.

2. In combination, a fore body and a flap supported in adjustable relation with said flap substantially in line chordwise with said fore body to form a wing adapted to be bathed by a relative flow of fluid, said flap having a chordwise extending upper surface contour which is concave along its forward portion of short length and convex along its aft portion of relatively greater length, the upper surface of said wing having a slot ahead of said concave surface adjacent thereto, and means to induce an inflow of air through said slot, said upper surface of said flap overlapping the aft upper side of said body and presenting a leading edge to a rearwardly moving flow across the upper side of said wing.

3. In combination in a wing adapted to be bathed by a flow of air, a fore body and a flap supported in adjustable relationship with said flap substantially in line with said fore body, said flap being adjustable to a lowered high lift position to confer on said wing an airfoil section whose maximum mean camber ordinate above the subtending chord is substantially greater than 12 per cent of the said chord length wherefore said flow tends to separate from the upper surface of said flap, said wing with flap depressed having an induction slot in its upper surface leading into the wing interior, the forward portion of said flap presenting a leading edge to said flow, means to induce a flow of the boundary layer air through said slot into said wing, the wing section contour aft of said slot having a short concave length succeeded by a relatively long convex length to provide a favorable pressure gradient aft of said slot of comparable magnitude along major portion of said lengths when said flap is in said lowered position.

4. In combination in a rotor for a direct lift aircraft, a hub structure adapted for rotation about an axis, a forward wing portion and a rearward wing portion supported on said structure in spaced relation to define a helicopter wing having a spanwise slot in the surface thereof, the segment of the surface adjacent the aft side of said slot having a chordwise concave portion of short length succeeded chordwise by a convex portion of relatively greater length, said concave portion overlapping said forward wing portion and having a free leading edge disposed thereabove providing a continuously favorable pressure gradient across said concave and convex portions, and means to induce a flow of air through said slot into the wing interior.

5. In combination in a rotor for a direct lift aircraft, a hub structure adapted for rotation about an axis, a plurality of wing portions supported on said structure in spaced relationship to define a hollow helicopter wing having a plurality of spanwise slots spaced chordwise in the surface thereof, the chordwise segments between spaced slots each having a chordwise concave portion of short length succeeded by a downstream convex portion of relatively greater length, said concave portion in combination with said convex portion extending from one successive slot to the other and providing a continuously favorable pressure gradient across said combination of portions, each said concave portion overlapping said forward wing portion and having a free leading edge disposed thereabove, and means to induce a flow of air through said slots into the wing interior.

6. In combination in a wing adapted for receiving a flow of air from front to rear thereacross, a plurality of chordwise spaced segments defining a plurality of induction slots therebetween leading into the wing interior, each said segment at its fore end having a chordwise concave portion of short length succeeded rearward by a chordwise convex portion of relatively greater length extending to the slot at the aft end thereof, said concave-convex segment providing a continuously favorable pressure gradient thereacross between successive said slots, and means to induce a flow of fluid into said wing interior through said slot, each said segment having a free leading edge exposed to said flow.

7. In combination in an aircraft body adapted to be bathed by a relative flow of fluid along the longitudinal direction thereof, a plurality of surface segments spaced apart in the longitudinal direction to form a plurality of spaced slots extending transversely to said relative flow direction, means to induce a flow of fluid inward through said slots, each said segment presenting a leading edge to said flow, each said segment between slots having a longitudinally concave curvature for a relatively short distance aft from its forward adjacent slot succeeded by a relatively long portion of chordwise convex curvature extending to the rearward adjacent said slot, each said concave-convex segment in cooperation with said adjacent slots providing a pressure curve chordwise thereover having declining pressure values rearward therealong and being free of reversals of slope.

8. In combination in a wing adapted to be bathed by a flow of fluid, a forebody and a flap supported in adjustable relation with said flap substantially in line with said forebody, said flap being depressible to a lowered high lift position, said wing with said flap depressed having a slot adjacent the upper aft end of said forebody, the upper surface of said flap aft of said slot presenting a leading edge to said flow, said flap upper surface having a short length of concave surface extending rearward from said slot succeeded by a relatively longer length of convex surface, said lengths cooperating to provide a favorable pressure chordwise from said slot rearward over substantially the whole combined chordwise lengths of said concave and convex surfaces, and means to induct fluid through said slots to cooperate with said lengths in providing said favorable gradient chordwise over said flap.

9. In combination in a wing adapted to be bathed by a flow of air, a forebody and a flap supported in adjustable relationship with said flap substantially in line with said forebody, said flap being adjustable to a lowered high lift position to confer on said wing an airfoil section whose maximum mean camber ordinate above the subtending chord is greater than twelve per cent of said chord length whereupon said flow tends to separate from the upper surface of said flap, said wing with flap depressed having at least two induction slots in its upper surface aft of the midpoint of the chord, and means to induce an inward flow of boundary layer fluid into said wing, the segment of the wing section contour between successive said slots having a short concave length succeeded by a relatively longer convex length, each said concave-convex length cooperating with said slots adjacent thereto to provide a pressure curve chordwise thereover having declining pressure values rearward therealong and being free of reversals of slope.

10. In combination in a wing for an aircraft adapted to be bathed by a flow of fluid thereacross, a forward wing portion, a rearward wing portion, means on said wing portions for supporting one upon the other in spaced relation defining a spanwise slot therebetween in the surface of said wing, the segment of the wing surface adjacent the rearward side of said slot having a chordwise concave portion of short length succeeded chordwise by a convex portion of relatively greater length, said concave-convex segment providing a continuously favorable pressure gradient across said portion rearwardly of said slot, said concave segment at its forward end extending at least as far above the mean camber line as the rearward end of the forward wing portion adjacent thereto, and means to induce a flow of air through said slot into the wing interior.

EDWARD A. STALKER.

References Cited in the file of this patent

UNITED STATES PATENTS

| Number | Name | Date |
|---|---|---|
| 2,406,920 | Stalker | Sept. 3, 1946 |
| 2,408,632 | Griffith | Oct. 1, 1946 |
| 2,438,254 | Stalker | Mar. 23, 1948 |
| 2,447,100 | Stalker | Aug. 17, 1948 |

FOREIGN PATENTS

| Number | Country | Date |
|---|---|---|
| 483,497 | Great Britain | Apr. 21, 1938 |